United States Patent [19]

Loren

[11] Patent Number: 5,162,122
[45] Date of Patent: Nov. 10, 1992

[54] INJECTION NOZZLE HAVING A RAISED LAND PORTION

[76] Inventor: Norman S. Loren, 24874 Chalk Farm Rd., Warren, Mich. 48091

[21] Appl. No.: 825,295

[22] Filed: Jan. 23, 1992

Related U.S. Application Data

[63] Continuation of Ser. No. 596,531, Oct. 12, 1990, abandoned.

[51] Int. Cl.⁵ ............................................. B29C 45/16
[52] U.S. Cl. .................... 425/130; 264/572; 425/573; 425/812
[58] Field of Search ............... 425/130, 572, 573, 588, 425/812; 264/328.8, 572

[56] References Cited

U.S. PATENT DOCUMENTS 3,301,935  1/1967  Stoeckhert ........................ 264/572
4,685,881  8/1987  Sasaki ................................ 264/572
4,935,191  6/1990  Baxi ................................... 264/572

*Primary Examiner*—Tim Heitbrink
*Attorney, Agent, or Firm*—Krass & Young

[57] ABSTRACT

A unitary nozzle for use in a gas assisted injection molding process wherein the nozzle includes a central axial resin passageway, a land portion of the nozzle extends radially into the resin passageway proximate the downstream or discharge end of the nozzle to define a generally U-shaped resin passageway terminating in a U-shaped aperture at the nozzle tip, and a central gas passageway is provided on the central axis of the nozzle within the land portion and exiting the nozzle in a circular aperture embraced within the U-shaped resin aperture at the downstream end of the nozzle so that mixing of the resin and gas during the injection and venting processes is minimized and so that ingestion of resin into the gas passageway during the venting process is minimized.

19 Claims, 3 Drawing Sheets

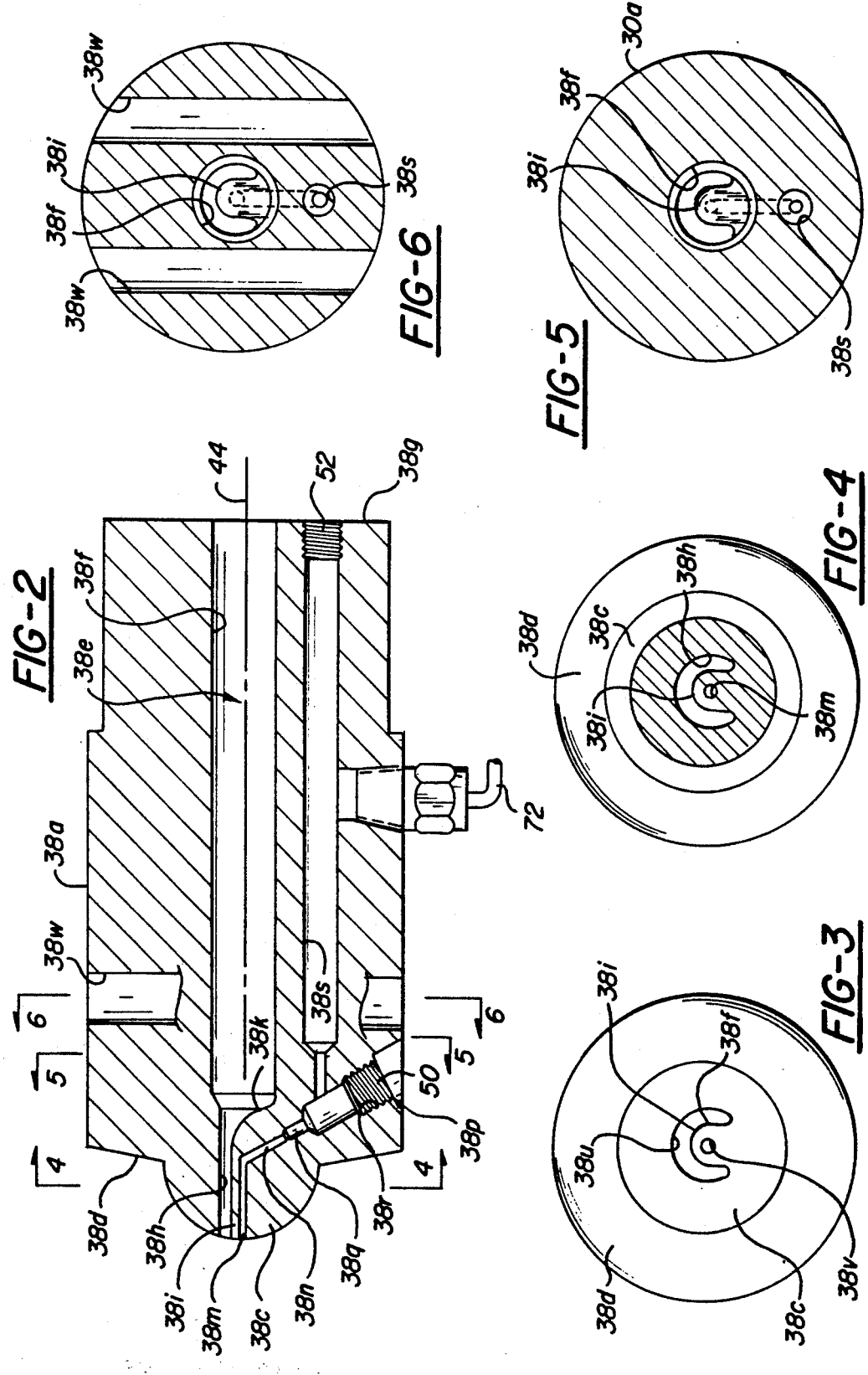

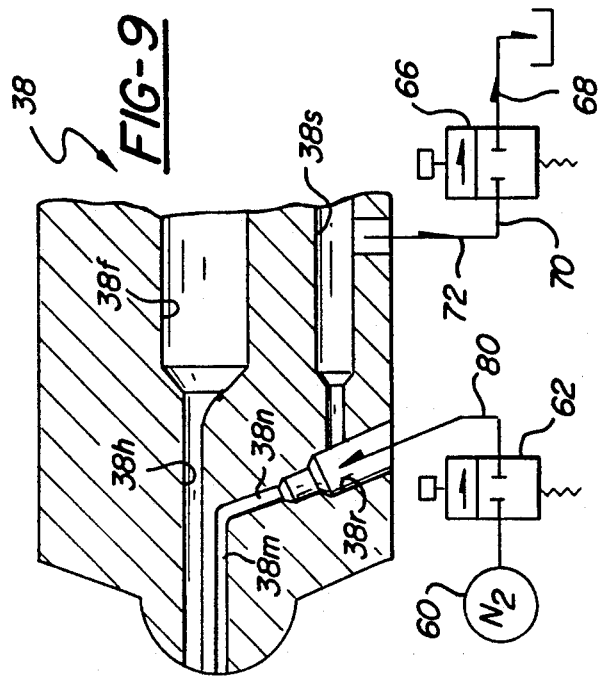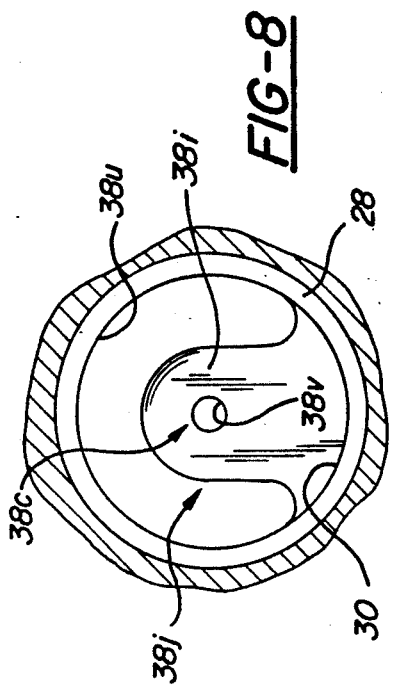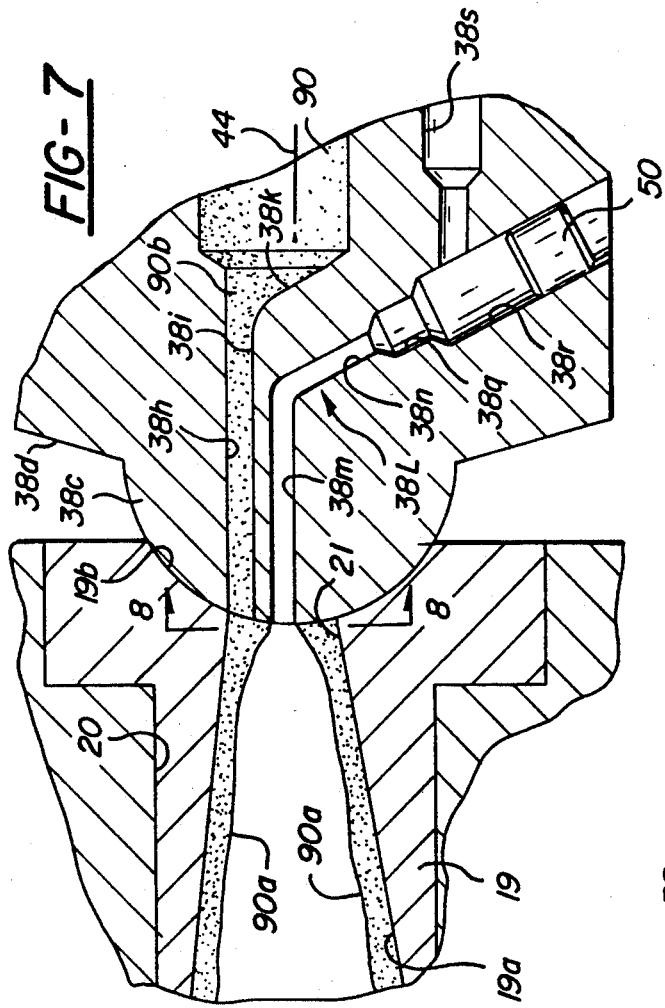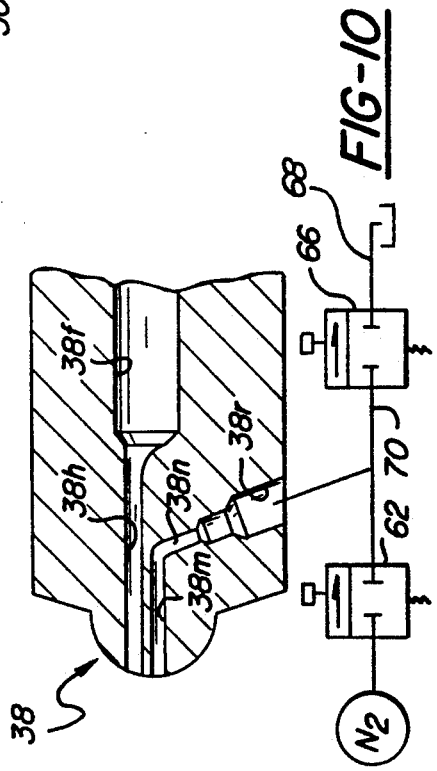

INJECTION NOZZLE HAVING A RAISED LAND PORTION

This is a continuation of application Ser. No. 596,531, filed on Oct. 12, 1990, now abandoned.

FIELD OF THE INVENTION

This invention relates to injection molding and more particularly to an injection nozzle specially suited for use in a gas assisted injection molding process.

BACKGROUND OF THE INVENTION

In the gas assisted injection molding process a quantity of resin is injected into a mold by conventional means and a gas such as nitrogen is injected into the resin melt under pressure to fill out the mold cavity with the resin, thereby creating a hollow body portion within the resin. The gas is held under a pressure to press the resin against the mold cavity while the resin is cooling and solidifying. After the resin has solidified sufficiently, the gas pressure is vented and the mold is thereafter opened and the part removed.

Numerous methods and apparatus have been devised to accomplish the gas assisted injection molding process. These prior art methods and apparatus include arrangements whereby the gas enters the resin melt from the resin injection nozzle, whereby the gas enters the resin melt through the sprue bushing, whereby the gas enters the resin melt through the runner system, or whereby the gas enters the resin melt directly into the mold cavity. The prior art methods and apparatus also propose various means of venting the gas to atmosphere following the solidifying operation.

To simplify the method and the apparatus it is desirable to inject the gas into the resin melt by means of the resin injection nozzle so that a separate gas injection device is not required. It is also desirable for the sake of simplicity to vent the gas from the mold cavity through the resin nozzle following the molding operation. However, although the use of a single nozzle to inject both the resin and the gas into the mold cavity and to thereafter vent the gas from the mold cavity is desirable from a simplicity standpoint, there have been problems in the prior art in attempting to design such a nozzle that would consistently produce high quality parts and long term, low maintenance operation. For example, gas and resin tend to mix within the injection nozzle during the process with the result that surface blemishes may be produced on the molded part. Further, during the venting of the gas back through the injection nozzle, resin is often drawn back with the gas into the gas passageway with the result that the gas passageway is blocked and must be cleaned. There have, in turn, been various attempts to address these problems. Some prior art attempts involve complex shutoff nozzles in combination with gas passageways. Not only are these devices complex, but they also continue to provide an area within the nozzle where the resin and gas can mix so that the resin can enter the gas passageway during the venting step and cause a blockage of the gas passageway and/or cause surface blemishes on the next part to be molded. These devices are also typically relatively large in size and may require modification of the associated injection molding machine. Because of their size, they may also require modification of the devices to adapt to different molds. In any event, these devices do not solve the problem of mixing or blockage and can be a source of high maintenance and downtime.

In other prior art attempts to address these problems, the resin is deliberately allowed to flow into the gas passageway during the venting operation with the intent that the resin will be blown out of the gas passageway and back through the gas aperture during the next molding cycle. However, the resin expulsion is often incomplete with the result that the resin remaining will degrade with heat and time and block the device. The degraded resin may also contaminant the part. In addition, this contaminant resin may be drawn back into the gas passageway upon venting, thereby speeding up the blockage.

In other prior art attempts to address these problems, needles have been used that project into the sprue bushing. Such needles are delicate in nature and are subject to distortion, blockage and breakage under the heat and pressure encountered in normal production cycles.

SUMMARY OF THE INVENTION

The present invention is directed to the provision of an improved nozzle for use in a gas-assisted injection molding process.

More specifically, the present invention is directed to the provision of a nozzle for use in a gas assisted injection molding process wherein the resin and gas are injected into the mold cavity through the same nozzle, without derogation of the quality of the molded parts produced, and wherein venting of the gas is achieved through the nozzle without creating blockage of the gas passageway in the nozzle.

The present invention is further directed to the provision of an injection nozzle that is simple in function and economical to manufacture and maintain.

The present invention is further directed to the provision of an injection nozzle that readily adapts to the injection molding machine without modifications to the machine; that can be used with a variety of molds without nozzle modification; and that is of a unitary construction requiring no moving parts or separate components.

According to an important feature of the invention, the injection nozzle has a unitary downstream end and includes separate resin and gas passageways extending axially within the nozzle and opening in separate apertures defined in the unitary downstream end of the nozzle. This arrangement provides an extremely simple nozzle construction and minimizes mixing of resin and gas during the process and minimizes the possibility of resin being drawn into the gas passageway during the venting process.

According to a further feature of the invention, the gas passageway aperture is at least as far downstream as the resin passageway aperture. This arrangement minimizes gas and resin mixing during the process and minimizes the possibility of resin being ingested into the gas passageway during the venting process.

According to a further feature of the invention, the gas passageway and resin passageway apertures are generally coplanar. This specific arrangement simplifies nozzle construction while minimizing undesirable resin and gas mixing during the injection and venting processes.

According to a further feature of the invention, the resin passageway comprises a central axial bore extending within the nozzle and embracing a raised land portion of the nozzle extending radially into the resin passageway and extending upstream in an axial direction from the nozzle tip and the gas passageway is provided in the raised land portion of the nozzle along the central axis of the nozzle. This arrangement provides a simple means of providing separate gas and resin apertures in the nozzle tip in a generally coplanar relationship.

According to a further feature of the invention, the raised land portion is an integral portion of the unitary downstream end of the nozzle such that it can be temperature conditioned to cover a range of resin materials to achieve the desired viscosities required. This nozzle construction further aids in minimizing or preventing the mixing of the gas and resin in the nozzle during the process and minimizes or prevents the possibility of resin being drawn into the gas passageway during the venting process.

In the disclosed embodiment of the invention, the nozzle tip is spherical; both the resin passageway and the gas passageway lie on the central axis of the nozzle; the gas passageway is provided in a land portion of the nozzle projecting radially into the resin passageway proximate the tip end of the resin passageway so as to define a U-shaped resin passageway proximate the tip; and the gas passageway further includes a radial portion extending from a location external to the nozzle into the land portion for connection to the axial gas passageway provided in the land portion.

BRIEF DESCRIPTION OF THE DRAWINGS

FIG. 2 is a fragmentary detail view of the nozzle employed in the injection molding system of FIG. 1;

FIG. 3 is an end view of the invention nozzle looking in the direction of the arrow 3 in FIG. 2;

FIG. 4, 5 and 6 are cross-sectional views taken on lines 4—4, 5—5 and 6—6 respectively of FIG. 2;

FIG. 7 is a detail view of the region at the interface of the nozzle and the mold aperture;

FIG. 8 is a fragmentary cross-sectional view taken on line 8—8 of FIG. 7;

FIG. 9 is a somewhat diagrammatic view of a modified form of invention nozzle; and FIG. 10 is a somewhat diagrammatic view of a further modified form of the invention nozzle.

DETAILED DESCRIPTION OF THE PREFERRED EMBODIMENT

Figure 1:
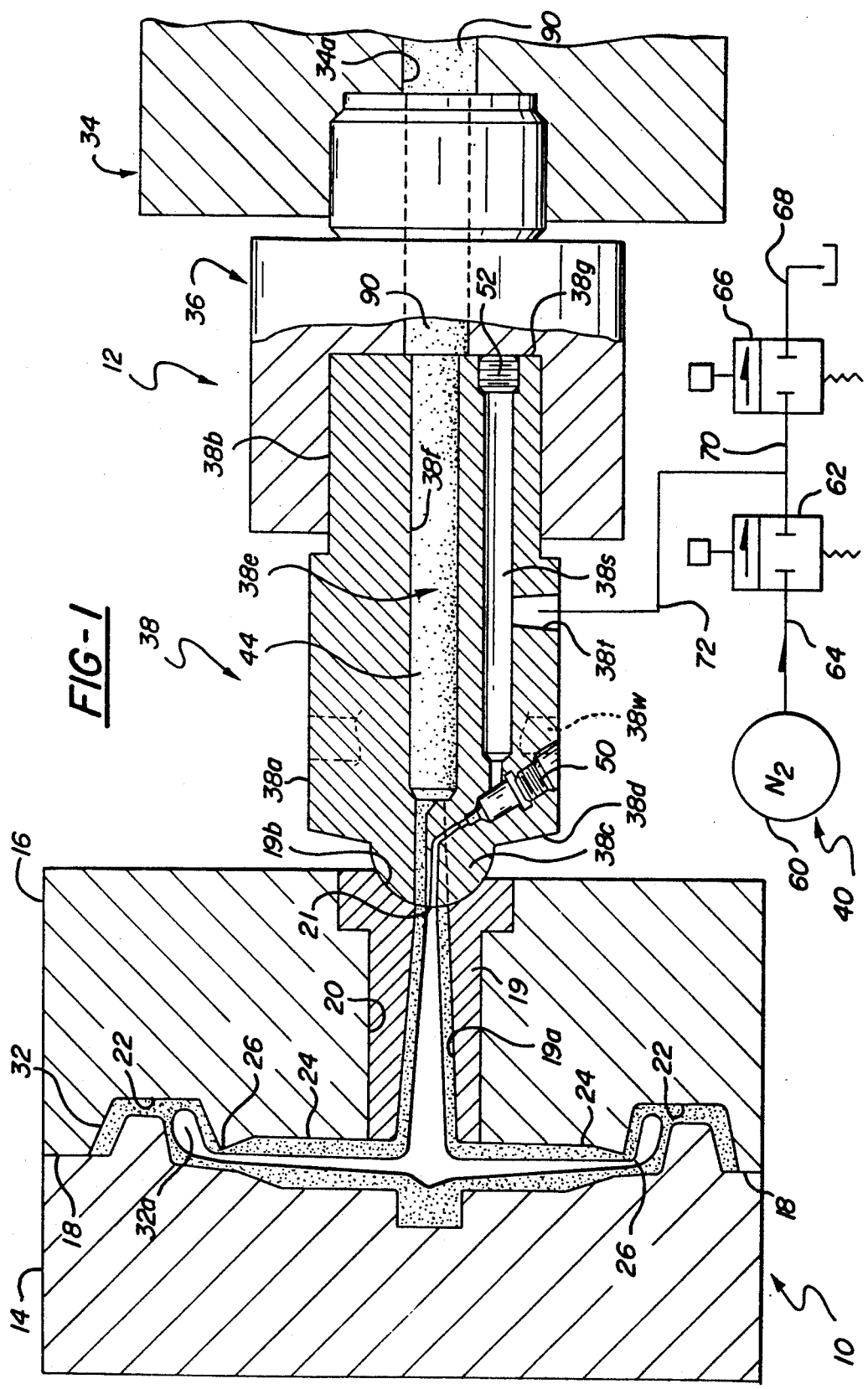
FIG. 1 is a fragmentary, longitudinal cross-sectional view of an injection molding system according to the invention.

The injection molding system seen in FIG. 1 includes a mold assembly 10 and an injection molding machine 12.

Mold assembly 10 is of known construction and includes mold halves 14 and 16 defining a parting line 18; a sprue bushing 19 positioned within a hole 20 in mold half 16 and defining a central sprue opening 19a, a spherical nozzle seating surface 19b, and a central mold aperture 21; a pair of mold cavities 22 defined between the mold halves; and runners 24 interconnecting sprue opening 19a and cavities 22 through gates 26.

It will be understood that resin is injected into the mold assembly through mold aperture 21 and sprue opening 19a for movement through runners 24 and through gates 26 into the mold cavities 22 and that, following the introduction of the resin into the mold cavities or simultaneously therewith, and according to known gas assisted molding techniques, pressurized gas is introduced through the sprue to fill out the mold cavities with resin and to form molded parts 32 having hollow portions 32a. It will further be understood that a gas pressure is maintained within hollow portions 32a of the molded parts until such time as the cooling cycle for the part is sufficient and the resin has cured, whereafter the gas is suitably vented through the sprue and the mold is opened to remove the part.

The injection molding machine 12 includes a barrel 34, a nozzle 38, and a gas supply and venting system 40. A shut off valve 36 of known form may also be provided between barrel 34 and nozzle 38. Barrel 34 is of known form and includes a screw (not shown) associated with a hopper for delivery of resin in pellet form to the barrel to allow the screw to operate in known manner to produce a resin melt which is delivered to the resin bore 34a of the barrel.

Nozzle 38 is of an integral unitary construction and may be formed of a suitable steel material.

Nozzle 38 has a generally cylindrical configuration and includes a main body portion 38a and a threaded portion 38b at the rear or upstream end of the nozzle for threaded receipt in a suitable threaded bore in valve 36. A central spherical tip 38c is provided at the downstream or forward end of the nozzle and coacts with an annular surface 38d to define the downstream end of the nozzle.

A resin passageway 38e extends centrally through the nozzle along the central axis 44 of the nozzle. Passageway 38e includes a large diameter bore portion 38f extending from the upstream end 38g of the nozzle and a reduced size resin passageway 38h extending from the downstream end of resin bore 38f and opening at its downstream end in the nozzle tip 38c.

A land portion 38i of the nozzle intrudes radially into the resin passageway 38h from the axial boundary wall of passageway 38h to include the area encompassed by the central axis 44 of the nozzle so that passageway 38h has a generally U-configuration in cross section embracing the land portion 38i and thereby the central axis of the nozzle. The upstream end 38k of land portion 38i is beveled or radiused to facilitate the downstream flow of resin around land portion 38i for discharge from the nozzle.

Nozzle 38 further defines a gas passageway 38l including an axial portion 38m extending within land portion 38i along the central axis of the nozzle; a generally radially extending portion 38n extending between the upstream end of passage portion 38i toward the outer periphery 38p of the nozzle; a counterbore portion 38q; a threaded counterbore portion 38r; an axial passage 38s extending axially through the nozzle from nozzle end face 38g in parallel relation to resin bore 38f and opening at its downstream end in counterbore 38r; and a radial bore or exit port 38t extending radially inwardly from the periphery 38p of the nozzle and intersecting axial bore 38s. Threaded plugs 50 and 52 are positioned in counterbore 38r and in the upstream end of bore 38s respectively so that the effective gas passageway extends radially through bore 38t, axially along bore 38s, radially inwardly along bores 38q and 38n, and axially along bore 38m. The location of the gas passageway exit port 38t at a location upstream of the nozzle tip permits the nozzle to have a non-interferring reach into the envelope of the mold assembly 10.

As best seen in FIG. 3, the resin passageway of the nozzle opens at the extreme downstream end of the nozzle tip in a U-shaped aperture 38u and the gas passageway of the nozzle opens at the extreme downstream end of the nozzle tip in a circular aperture 38v of small size centered on the central axis 44 of the nozzle and defined in the extreme downstream end of land portion 38i. It will be seen that aperture 38v is defined at the extreme downstream end of nozzle tip 38c and that resin aperture 38u is essentially coplanar with aperture 38v although displaced slightly upstream from aperture 38v by virtue of the spherical configuration of the nozzle tip 38c. It will further be seen that land portion 38i extends axially from the nozzle tip 38c to upstream end 38k and is configured such that a cross section taken through the nozzle at any axial location from the tip to upstream end 38k includes solid nozzle material extending radially and continuously inwardly from the boundary wall of passageway 38h and enclosing the gas passage 38n.

Gas supply system 40 includes a pressurized supply 60 of an inert gas such as nitrogen; a pilot operated normally closed control valve 62 interconnected to gas supply 60 via a conduit 64; a further pilot operated normally closed control valve 66 connected to atmosphere via a conduit 68; a conduit 70 interconnecting control valves 62 and 66; and a conduit 72 interconnecting conduit 70 and passage 38t in the nozzle.

Transverse bores 38w are provided in the downstream end of the nozzle main body portion 38a for receipt of suitable temperature conditioning means such as kalrods or water bubblers. For example, two parallel bores 38w may be provided with the bores positioned on opposite sides of resin passageway 38f. Alternatively, band type temperature conditioning means may be positioned around the outer periphery of the downstream end of the nozzle. A thermocouple (not shown) may also be provided for temperature control.

In use, nozzle tip 38c is positioned against the spherical seating face 19b of sprue bushing 28 with the resin passageway of the nozzle aligned axially with the axis of the sprue bushing so that the resin aperture 38u coincides with the mold aperture 21 and so that the axial portion 38m of the gas passageway is aligned with the central axis of the sprue bushing, whereafter a resin melt 90 is injected in known manner from the barrel 34, through a suitable axial passage in the shut-off valve 36, and through the resin passageway 38e of the nozzle for passage through the mold aperture 21 and through the sprue bushing 28, runners 24, and gates 26 for entry into the mold cavities 22 to form the molded parts. Immediately after the injection of the resin into the mold cavity, or simultaneously therewith, gas is injected into the mold cavities through the gas passageway to assist in known manner in ensuring that the resin fills out the mold cavity. Specifically, with valve 62 opened and valve 66 closed, gas is delivered from nitrogen supply 60 through conduit 64, through valve 62, through conduits 70 and 72, and through passages 38t, 38s, 38r, 38q, 38n and 38m for exit from the nozzle through aperture 38v and into the sprue.

After the parts have cured in the mold cavities, the gas is vented from the mold cavities by opening valve 66 so that the gas may vent through the sprue and through the gas passageway and through lines 70 and 72 and valve 66 to atmosphere via line 68.

It must appreciated that the avoidance of mixing of the gas and the resin within the nozzle, irrespective of the type of venting step employed, is one of the important features of the invention.

Specifically, as best seen in FIG. 7, the disposition of the gas passageway aperture and the resin passage aperture at the extreme downstream end of the nozzle tip in generally coplanar relation has the effect of eliminating or minimizing any mixing of the gas and resin during the injection and venting processes and has the further effect of minimizing the possibility of resin being ingested into the gas passageway during the venting process.

At the start of a resin injection operation, there is no resin in the sprue bushing; the resin in the nozzle tip is viscous but is flowable under screw forward pressure; the resin upstream of the nozzle tip becomes progressively hotter and progressively less viscous in proportion to the distance from the tip of the nozzle; the resin in the barrel is the hottest and therefore the least viscous; and the empty sprue bushing is relatively cold because the mold assembly is temperature controlled for resin cooling. The nozzle and barrel are also temperature conditioned in known manner to provide the desired resin viscosity in the barrel and in the nozzle through the selective addition of heat to the resin. In particular, the nozzle may be heated to maintain the resin in the nozzle in a flowable condition despite heat dissipation into the cold sprue bushing.

Alternatively, the resin in the nozzle tip may be cooled to maintain the desired resin viscosity. The nozzle may also be retracted from the sprue bushing after the step of venting to aid in temperature conditioning.

During the resin injection operation, a hot resin melt is injected through the nozzle, through the sprue bushing, and into the mold cavities with the first resin cooling at a faster rate versus time and with the last part of the resin injected being the hottest. Some resin, in contact with the surfaces of the mold cavity and the sprue, starts to solidify fairly quickly whereas the resin in the nozzle is cooling but is still relatively hot. Because the nozzle temperature is cooler than the barrel temperature, the resin in the nozzle becomes more viscous. The resin in the sprue bushing is progressively hotter toward its axial center.

When the gas is thereafter injected through the gas aperture no resin is displaced from the nozzle, nor does gas mix with the resin in the nozzle, since the gas aperture is at the extreme downstream tip of the nozzle in contrast to prior art nozzles where the location of the gas aperture upstream of the resin aperture has the effect of displacing resin from the nozzle as the gas is injected, and/or of mixing gas with the resin in the nozzle. After the resin in the cavities, runners and sprue has sufficiently solidified, the gas may be vented to atmosphere by the opening of valve 66. During this venting process, there is no mixing of gas with the resin in the nozzle as the gas exits from the mold assembly. Specifically by virtue of the coplanar relationship of the resin and gas aperture in the nozzle, as the gas leaves the mold cavity it encounters only the relatively solidified resin 90a in the sprue bushing and runners, as opposed to any relatively flowable resin 90 in the nozzle, so that there is no mixing of gas and resin during the venting process and so that, accordingly, there is little likelihood of any resin being entrained or sucked up in the gas or ingested into the gas passageway to ultimately block the passageway. The elimination of mixing between the gas and resin during the venting process, in addition to precluding blockage of the gas passageway, has the effect of substantially eliminating any "froth" formation proximate the nozzle tip during the venting process that could result in blemishes in the parts molded in the next molding operation.

The nozzle of the invention will thus be seen to overcome the problems associated with prior art nozzles of the type in which the gas is injected and vented through the resin nozzle and, specifically, by locating both the resin aperture and the gas aperture at the extreme downstream end of the nozzle in generally coplanar but separate relation, the possibility of mixing of gas and resin in the nozzle during the injection process with resulting blemishes in the molded part is minimized; the possibility of ingesting resin into the gas aperture during the venting process, with resultant blocking of the gas passage, is minimized; and the possibility of mixing of gas and resin during the venting process with the resultant formation of froth proximate the nozzle tip and the resultant formation of blemishes in the next part to be molded, is minimized.

The nozzle arrangement seen in FIG. 9 is similar to the nozzle arrangement of FIGS. 1-8 with the exception that the plug 50 is omitted from counterbore 38r in the nozzle and the nitrogen from valve 62 is fed directly into the bore 38r and thence through the remainder of the gas passageway via a conduit 80, and the gas is vented by opening valve 66 and allowing the gas to vent through passageway 38s, lines 72 and 70, valve 66, and conduit 68. The embodiment of FIG. 9 thus in effect provides separate conduit means for the introduction of gas into the nozzle for use in the injection process and a different discharge location in the nozzle for the venting of gas from the mold cavities following the resin solidification.

The nozzle arrangement seen in FIG. 10 is similar to the nozzle arrangements of FIGS. 1-8 and FIG. 9 with the exception that gas is delivered to the nozzle and vented from the nozzle directly through passageway portion 38r, thereby eliminating the need for axial passage 38s and radial passage 38t with resultant simplification in the nozzle construction. The arrangement of FIG. 10 would be utilized in situations where the molding machine construction and environment is such that there is no need to provide a non-interferring reach of the nozzle into the envelope of the mold assembly.

Whereas preferred embodiments of the invention have been illustrated and described in detail, it will be apparent that various changes may be made in the disclosed embodiments without departing from the scope or spirit of the invention.

I claim:

1. An elongated resin and gas injection nozzle defining a downstream nozzle tip, said injection nozzle including an axially extending resin passageway opening in a resin aperture in said nozzle tip, a raised land portion extending radially inwardly into said resin passageway from the axial boundary wall of said resin passageway, and a gas passageway extending axially in said land portion and opening in an aperture in said nozzle tip, said land portion extending axially from said nozzle tip to a location upstream of said nozzle tip and being configured such that a cross section taken through said injection nozzle at any axial location from said tip to said upstream location includes solid land portion material extending radially and continuously inwardly from said boundary wall and enclosing said gas passage.

2. An injection nozzle according to claim 1 wherein said injection nozzle is attached to a gas assisted injection molding apparatus for performing a molding operation in a mold and wherein said molding apparatus includes means for delivering resin to said resin passageway for discharge from said resin aperture into an aperture in the mold, means for supplying gas to said gas passageway for discharge through said gas aperture to assist in the molding operation, and means for venting gas from the mold.

3. An injection nozzle according to claim 2 wherein an end of the gas passageway remote from the gas aperture exits the injection nozzle through a single opening and gas is delivered to said injection nozzle to assist in the molding operation through said opening and is vented from the mold through said opening.

4. An injection nozzle according to claim 2 wherein an end of the gas passageway remote from the gas aperture exits the injection nozzle through first and second openings, gas is delivered to said nozzle to assist in the molding operation through the first opening, and gas is vented from the mold through the second opening.

5. An injection nozzle according to claim 1 wherein the gas passageway aperture is at least as far downstream as the resin passageway aperture.

6. An injection nozzle according to claim 1 wherein said apertures are generally coplanar.

7. An injection nozzle according to claim 5 wherein the injection nozzle has a central axis, said land portion includes said central axis, and said gas passageway includes an axial portion lying on the central axis of the nozzle.

8. An injection nozzle according to claim 5 wherein the injection nozzle has a central axis, the downstream end of the nozzle defines a spherical end surface, the gas passageway aperture is defined on the central axis of the nozzle, and the resin passageway aperture is defined in the spherical end surface of the nozzle offset with respect to the central axis of the injection nozzle so that the resin aperture is displaced upstream from the gas aperture.

9. An injection nozzle according to claim 2 wherein the resin is discharged and means are provided to prevent blockage of said gas passageway.

10. An injection nozzle according to claim 7 wherein said gas passageway further includes a radial portion extending between a location external to said injection nozzle into said land portion for connection to said axial gas passageway portion.

11. An injection nozzle according to claim 7 wherein said resin passageway upstream of said land portion is centered on said central axis.

12. An injection nozzle according to claim 2 wherein the gas is discharged and means are provided to prevent mixing of the gas and resin within the injection nozzle.

13. An injection nozzle according to claim 5 wherein means are provided to prevent mixing of the gas and resin within the injection nozzle.

14. An injection nozzle comprising a main body nozzle portion defining a central axis and terminating at a downstream end thereof in a nozzle tip, a central axial resin passageway extending along said main body portion and opening in said tip in an aperture not including a solid land portion of said nozzle that projects radially into said resin passageway and includes said central axis, and a gas passageway including an axial portion extending essentially along said central axis within said land portion and opening in said tip in an aperture that is generally coplanar with said resin passageway aperture, said land portion extending axially from said nozzle tip to a location upstream of said nozzle tip and being configured such that a cross section taken through said injection nozzle at any axial location from said tip to said upstream location includes solid injection land portion material extending radially and continuously inwardly from said boundary wall and enclosing said gas passage.

15. An injection nozzle according to claim 14 wherein said resin passageway aperture has a U-configuration in cross section to embrace said land portion.

16. An injection nozzle according to claim 15 wherein said gas passageway further includes a radial portion extending from a location external to said injection nozzle and into said land portion for connection to said axial portion.

17. A resin and gas injection nozzle comprising:
a main body portion defining a central axis and terminating at a downstream end thereof in a nozzle tip; and
an axial resin passageway extending within said main body portion and embracing a raised land portion of said main body portion extending radially into said resin passageway and extending upstream in an axial direction from said nozzle tip;
said raised land portion defining an axial gas passageway and said resin passageway and said gas passageway terminating in separate apertures in said nozzle tip;
said raised land portion extending axially from said nozzle tip to a location upstream of said nozzle tip and being configured such that a cross section taken through said injection nozzle at any axial location from said tip to said upstream location includes solid land portion material extending radially and continuously inwardly from said boundary wall and enclosing said gas passage.

18. An injection nozzle according to claim 17 wherein said nozzle tip defines a spherical end surface, the gas passageway aperture lies essentially on the central axis of said injection nozzle, and the resin passageway aperture opens in the spherical end surface of said tip radially outwardly of said central axis.

19. An injection nozzle according to claim 18 wherein said resin passageway aperture has a U-configuration in cross section and embraces said gas passageway aperture.

* * * * *